United States Patent [19]
Nordstrom

[11] 4,124,119
[45] Nov. 7, 1978

[54] AUTOMOBILE CARRIER FOR USE ON AIR CARGO PALLETS

[75] Inventor: Arnold B. Nordstrom, Torrance, Calif.

[73] Assignee: Transequip Inc., El Segundo, Calif.

[21] Appl. No.: 821,245

[22] Filed: Aug. 2, 1977

[51] Int. Cl.² .............................................. B65D 85/68
[52] U.S. Cl. ...................................... 206/335; 206/600;
214/10.5 R; 248/119 R; 244/118 R
[58] Field of Search ................. 206/335, 386, 600;
214/10.5 R; 244/118 R; 248/119 R; 108/56.3

[56] References Cited
U.S. PATENT DOCUMENTS

| | | | |
|---|---|---|---|
| 2,521,088 | 9/1950 | Phelps | 206/335 |
| 3,178,216 | 4/1965 | Huber | 206/335 |

*Primary Examiner*—William T. Dixson, Jr.
*Attorney, Agent, or Firm*—Lindenberg, Freilich, Hornbaker, Wasserman, Rosen & Fernandez

[57] ABSTRACT

An automobile carrier is disclosed for use on two standard air cargo pallets to carry four automobiles. The carrier for two automobiles is affixed across two pallets with one automobile over the other, and the carrier for the other two automobiles is affixed across the pallets beside the first. The carrrier can be dismantled for shipping back to the starting point. Upon erecting the carrier for reuse, a variety of adjustments can be made for mixing automobile sizes on the top and bottom. These adjustments also keep the combination of any four automobiles within the dimensional limits of the pallets, the aircraft door opening and the ground equipment.

16 Claims, 13 Drawing Figures

ABILE CARRIER FOR USE ON AIR
CARGO PALLETS

BACKGROUND OF THE INVENTION

This invention relates to air cargo carriers, and more particularly a carrier that may be erected on standard pallets for carrying as many as four automobiles on two pallets, where the automobiles may be any combination of different makes and models with only limitations as to total width and total weight, and length of each automobile.

It is common practice to load air cargo onto 96 inch × 125 inch IATA-type pallets which have the continuous "seat track" type of attachments on all four sides for securing cargo, with one pallet lengthwise on each side of the center line of the aircraft. It would be desirable to load small automobiles in two tiers onto pallets for shipment by air cargo, but 125 inches is not sufficient length for even the small European automobiles. It would be necessary to lock two pallets together and stow the automobiles transversely. Two pallets would yield a length of 192 inches plus the space of about four inches between the pallets necessitated by the centerline locks. This allows a useable base width of 125 inches for two automobiles side by side, including at least 1.5 inches of space between automobiles. Allowing for a 1.5 inch overhang, maximum total width for the lower pair of autos is 128 inches limited by the loading equipment required to handle two pallets simultaneously. The aircraft side loading door is 134 inches wide and the maximum width of the upper pair of autos should not exceed 132 inches as controlled by the adjustments. Another practical limit is the total height of two automobiles loaded on the carrier. Other practical requirements are that the carrier be capable of being dismantled so that the parts of several units may be easily stacked on one pallet for shipment back to the starting point. The high density packaging permitted by the "knockdown" design maximizes the space available for revenue freight on the back haul, or return trip.

SUMMARY OF THE INVENTION

In accordance with a preferred embodiment, a carrier for two automobiles is affixed transversely across two pallets locked together by lower rail assemblies, where both assemblies are identical for interchangeability. Each rail assembly is comprised of a tube structure having a horizontal flange extending outwardly. The flanges serve as ramps for the automobile wheels while the tubes serve as curbs or guides used in loading an automobile as well as the structural members. The tube structure on each side is in two parts joined together at the center by a locking bridge assembly over the centerline locks of the cargo aircraft. Each part of the tube structure is provided with an ear at the end remote from the locking bridge assembly for connecting an upper rai support post. Upper rail assemblies are connected between pairs of posts on each side, and both upper rail assemblies are identical for interchangeability. Each upper rail assembly is comprised of two tube structures, each having a horizontal flange extending inwardly. The two tube structures are connected by a third tube bent upwardly in the middle. Each half of this bent tube is inserted into one of the two tubes to form one upper rail assembly. The flanges of the upper rail assemblies serve as ramps for a second tier automobile while the tubes serve as the structural component and act as the curbs or guides used in loading an automobile.

This outside-inside arrangement for the flanges allows the entire carrier for two automobiles to be within the width of the autos being carried. The flanges or ramps on the lower tubes apply a torque to the tube which is transferred to the pallets by the end plates. Similarly the flanges or ramps on the upper tubes apply a torque to the tube which is resisted by transverse spreader tubes. These spreader tubes, placed just forward of the front wheels and just back of the rear wheels, keep the rails spread the desired distance for the automobile stored in the upper position. The desired position of the lower rails is maintained by fastening the lower rails directly to their pallets at the ends. An X-bar brace which unfastens at the center to open like gates swung from the posts assures lateral rigidity for the second tier automobile, and braces from the corner posts to the upper ramp tubes for lateral rigidity. Once the upper automobile (last on/first off) is removed, the X-bar gates at one end of the carrier are unfastened and swung open as the first step to remove the lower automobile from the carrier. The posts, to which the open gates are connected, are then disconnected from the lower rails and swung outwardly where they are held by a brace hinged near the lower end of the post. This repositioning of the posts affords the clearance necessary to remove the lower auto. To support the upper rails during this procedure, the upper posts are supported by temporary bowed braces extending from the lower rails at a position near the gate being used for access. Having removed the automobiles, the carrier can be disassembled into fourteen basic subassemblies for return shipment.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
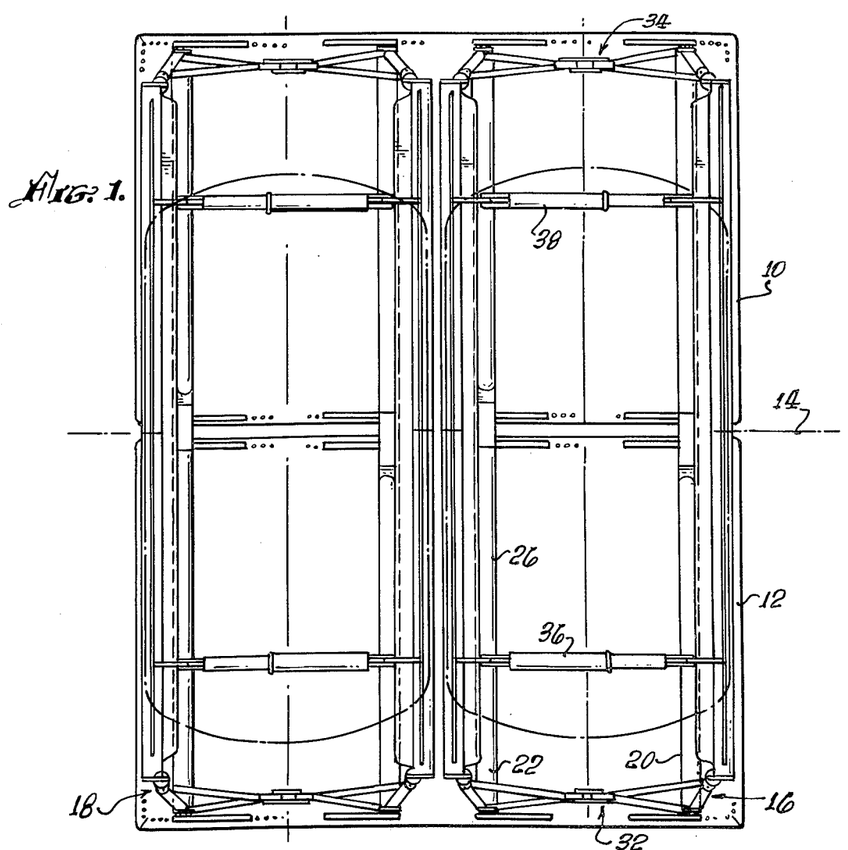
FIG. 1 is a plan view of the present invention.

Referring now to FIG. 1, there is shown a plan view of two pallets 10 and 12 disposed on either side of the fuselage centerline 14 of a cargo aircraft. Each pallet is standard of nominal length 125 inches and nominal width 96 inches. The spacing between pallets in the aircraft is a nominal 4 inches, providing a total space over two parallel pallets of 125 inches × 196 inches for transporting four compact or subcompact automobiles of a class typified by those made in Europe. Two automobiles are carried side by side across the pallets, as shown by phantom lines in the plan view of FIG. 1, and two more are carried above the first as shown by phantom lines in the elevation view of FIG. 2.

All four automobiles are supported on the two pallets by two separate and independent carriers 16 and 18, each carrier being assembled and locked on the pallets to combine the two pallets into one integral structure. Once the automobiles are loaded, the pallets and loaded carriers are lifted to the door of a cargo aircraft by a standard lift which has clearance of 129 inches at the bottom for a maximum total width of two automobiles that can be loaded in the lower tier of 128 inches. Thus, with overhang of the sides of the automobiles in the lower tier, the maximum clearance required by a loaded carrier is controlled to less than about 128 inches, as will be described more fully hereinafter. The width of the aircraft door is 134 inches so that the total width of the upper tier automobiles is controlled to less than about 132 inches. Once loaded into the aircraft, the pallets can be positioned along the length of the aircraft with one pallet on each side of the fuselage center line. The carrier, which locks the pallets together, controls the four inch spacing between pallets.

Figure 2:
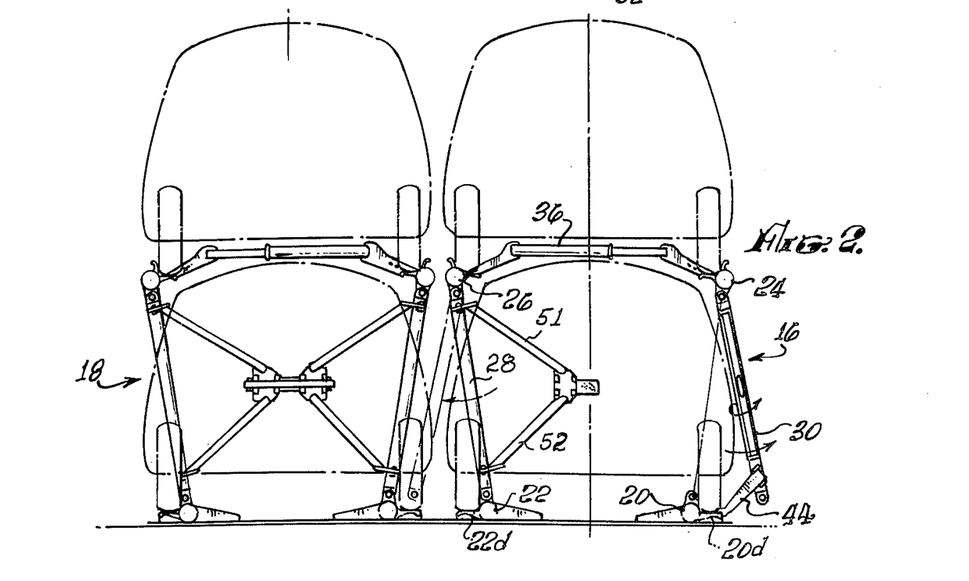
FIG. 2 is an end elevation of FIG. 1.

As just noted, the structure of the automobile carriers 16 and 18 is locked on the pallets 10 and 12 across, instead of with, the length of the pallets to cause two pallets to act as one. The two pallets are locked together by means of a pair of rails comprised of flanged torque tubes 20 and 22 for each two-automobile carrier. Since the pair of carriers are identical in construction and use, specific reference will hereafter be made only to the one carrier 16 that is erected on the torque tubes 20 and 22. FIG. 2 shows this one carrier fully erected, with loaded automobiles shown in phantom lines.

Figure 3:
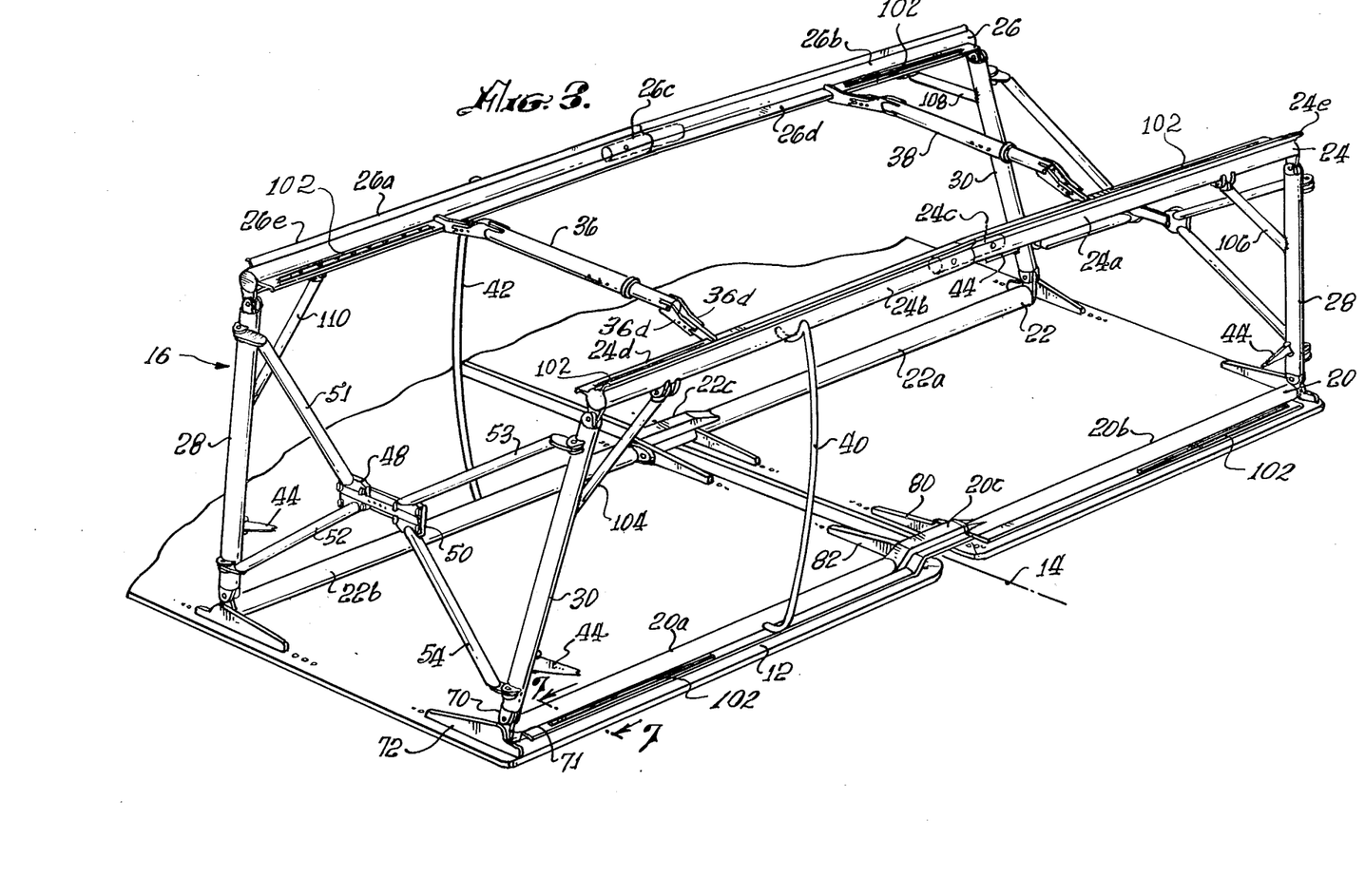
FIG. 3 is a perspective one of the two carriers shown in FIGS. 1 and 2.

Each of the lower torque tubes is comprised of two tube sections separately identified in FIG. 3 by letters *a* and *b* with the reference numerals 20 and 22. The "*a*" sections of tubes 20 and 22 are identical and include bridge extensions 20c and 22c which pass over the four-inch span between the pallets. The "*b*" sections are also identical. Therefore, each torque tube may be used in either position of a pair for erection of a carrier. It is only necessary to orient a pair with their flanged ramps outside. The ramps are identified by the letters *d* in FIG. 2 with the numerals 20 and 22. The form of these flanged ramps may be more clearly seen in FIG. 4. The torque tubes themselves serve as guide rails on the inside of the automobile wheels in the lower position of the carrier. An automobile is supported in the upper position by rails comprised of flanged torque tubes 24 and 26.

Each of the upper torque tubes is comprised of two tube sections separately identified in FIG. 3 by the letters *a* and *b* with the reference numerals 24 and 26. The "*a*" sections are identical to the "*b*" sections, except that the "*a*" sections have inserted, and pinned in place, a coupling tube identified by the letter *c* with the reference numerals 24 and 26. To assemble the rails, the coupling tubes are inserted into the "*b*" torque tubes and locked together with lock pins. The coupling tube may be permanently pinned to the "*a*" tubes or pinned with lock pins only at the time of assembly. In either case both torque tubes 24 and 26 will be comprised of identical "*a*" and "*b*" sections, with a coupling tube "*c*" inserted to lock their ends together.

The coupling tubes are the same for each side, and each coupling tube has an angle in it at the center which, when inserted and pinned in the "*a*" and "*b*" sections, will cause the centers of the torque tubes 24 and 26 to be raised (deflected) about 1.5 inches above horizontal to optimize clearance of lower automobile under downward G loads to be experienced in flight.

Each of the upper torque tubes has a flanged ramp identified by the letter *d* with the reference numerals 24 and 26. These tubes are assembled with the flanged ramps inside, as shown in FIG. 2. Additional flanges identified by the letter *e* are provided to enhance the guiding function of the tubes.

The assembled upper rails are supported at each end by a pair of posts 28 and 30. Each post is clevised at both ends to ears on the torque tubes. This permits the spacing of the lower torque tubes to be set for an automobile having one tread width independent of the spacing of the upper torque tubes set for an automobile having another tread width, where the "tread width" is the lateral distance between the centerline of one wheel and the centerline of the other wheel.

Figure 10:
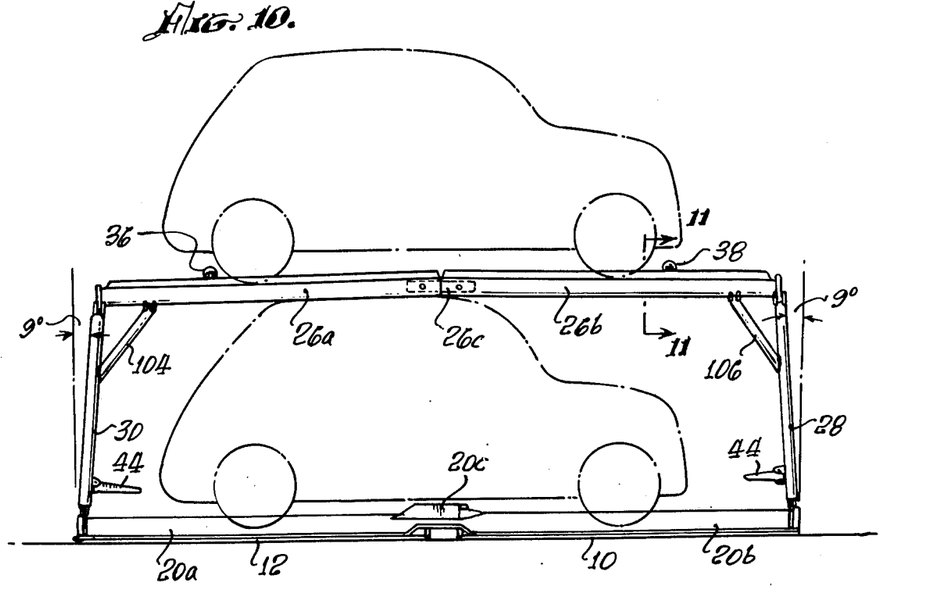
FIG. 10 is a side elevation of FIG. 1.

Some automobiles may have a slightly smaller tread width in front, or in back, in which case the rails which are to support such an automobile will be set for the average, or slightly less than average. The tires spaced further apart will then simply ride higher on the torque tubes, but by deflating the tires slightly, that will not be apparent. In each case the pair of support posts 28 and 30 at each end will be tilted outwardly, as may be better seen in FIG. 2, and the pair of support posts 28 and 30 on each side will be tilted slightly toward each other as will be better seen in FIG. 10. The latter tilt obviously enhances the lateral rigidity of the assembled carrier for support of the upper automobile. The outward tilt of the support posts as viewed from the end in FIG. 2 enhances the transverse rigidity of the assembled carrier in a less obvious manner.

The flanged ramps of the lower rails extend outwardly while the flanged ramps of the upper rails extend inwardly, as best seen in FIG. 2. The weight of the upper and lower automobiles imposes torque on the tubes on each side, but the posts connecting these tubes are held apart the required space by end gates 32 and 34 and spreaders 36 and 38 as may be more clearly seen in FIG. 3. The end gates are in the form of X-bar braces to assure transverse rigidity of the carrier.

Before describing in further detail the spacing bars, and the manner of fastening the lower rails to the pallet to set the spacing for the lower automobile, the gates will be described. In the description, it is assumed the spacing of the rails for the upper and lower automobiles have been set, and that the lower automobile has been driven or otherwise placed on the lower ramps with the X-bar gate on one end swung open. The gate opens from the center and swings on each side. The end posts are unfastened from the lower torque tubes while the gate is open in order that they be swung from the upper torque tubes out of the way of the automobile being loaded, as shown in FIG. 2 for the post 28.

The upper rails are supported by bowed-out braces 40 and 42 shown in FIG. 3 while the gate is swung open. Each of the posts has a brace 44 pivoted on an axis at an acute angle with the axis of the post. While a post is swung out of the way of an automobile, as shown in FIG. 2, the brace is swung into engagement with the edge of the ramp on the lower torque tube as shown for the post 28 in FIG. 2.

Once the lower automobile is loaded, the pivoted braces are swung up out of the way, the posts are swung into position for a pin to be inserted for engagement of the clevised end of the post with an ear on the torque post, as is more clearly shown in FIG. 3. The braces 40 and 42 may then be removed and the two halves of the gate closed as shown in FIG. 4, with a locking mechanism 46 securing the two halves.

Figure 5:
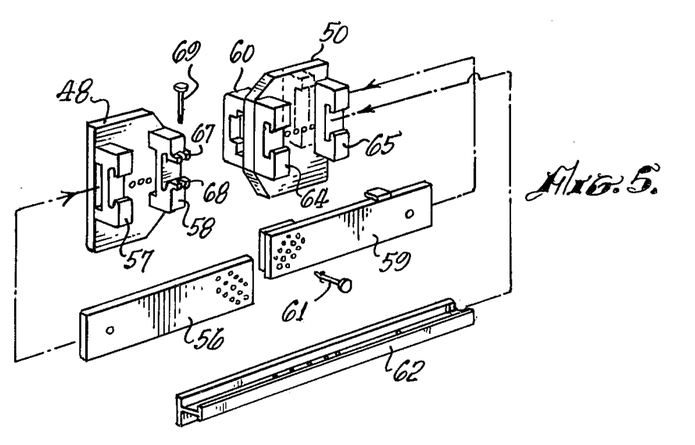
FIG. 5 illustrates in an exploded view a bar locking means for the structure of FIG. 4.

FIG. 5 illustrates in an exploded view the lock mechanism. It is comprised of two guide blocks 48 and 50. Block 48 is welded to tubes 51 and 52, while block 50 is welded to tubes 53 and 54. A locking bar 56 retained by slotted guides 57 and 58 in front of the guide block 48 overlaps a locking bar similarly retained by guides in back of the guide block 50, as by a slotted guide 60. The two lock bars can be slid in their guides until a pair of holes in the matrix of holes on the end of each are aligned. A lock pin 61 is then inserted through the aligned holes. Following that, a third locking bar 62 is inserted into C-shaped slots in guides 57 and 58 on block 48, and in guides 64 and 65 on block 50. The third lock bar is in the form of an I beam in cross section so that a horizontal part in the middle allows one end of the I beam cross section to ride outside of the C-shaped guides a sufficient distance to allow horizontally flanged and notched ends 67 and 68 of one C-shaped guide to be aligned with a hole in the horizontal part of the third lock bar. A pin 69 inserted through the notched ends 67 and 68 of the one C-shaped guide and a hole in the horizontal part of the third bar then holds the third bar in locking position.

Figure 4:
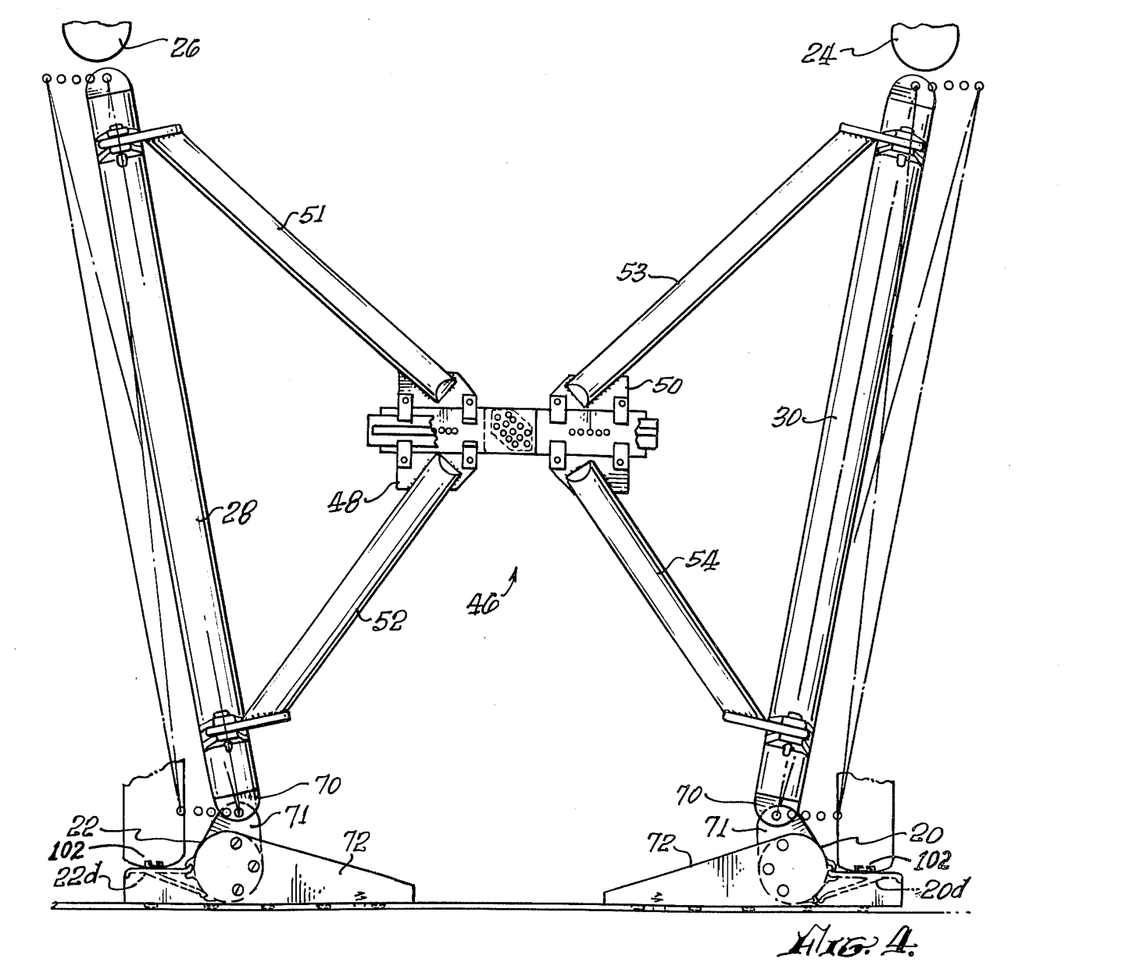
FIG. 4 illustrates in an enlarged view details of the end structure for the carrier of FIG. 3.

It should be noted that a variety of positions of the posts 28 and 30 at both the top and the bottom, as shown in FIG. 4, will call for the locking mechanism of the X-shaped gate to accommodate the two halves joining across a variety of spans and at different angles. However, this presents no problem because the matrix of holes on the locking bars 56 and 59 will allow for at least one set of holes to be aligned. It should be noted that the bar 59 has a block 59a which fills the space between the bars 56 and 59 when the two halves of the gate are closed with the two guide blocks 48 and 50 in a common plane. This will assure that undue tensile stress will not be applied to the pin which can withstand a very high shear stress in locking the gate. The gate lock is reinforced by the third locking bar which, due to its I-beam cross section, will assure that the two halves of the gate remain in a common plane under a great load. The hinges for the two halves of the gate are comprised of clevises 70 welded to the posts and ears 71 welded to the ends of the tubes 51 through 54 of the gate. Pins or bolts through the clevises and ears will withstand all of the shear stress which the gate pin 61 has to withstand.

The manner in which the lower torque tubes are secured to the pallet will now be described with reference to FIGS. 6, 7, 8 and 9. Since the fastening means is the same for each end, except that at the other end it is turned around, only one at the near end of torque tube 20 will be described. A plate 72 which is to be locked onto the pallet 12 is bolted to the ear 71 welded to the torque tube 70. The edge of the pallet has an extruded frame 12a with a channel 12b with holes 12c into the channel on one inch centers. The holes are connected by a slot of a width less than the diameter of the holes, and the diameter of each hole is sufficient to receive the head of any of five pins 73 screwed into the base of the plate 72. The pins 73 are spaced on one inch centers, or multiples of one inch, to permit their heads to all drop into the channel 12b through holes 12c. The plate is then shifted one half inch in either direction of the channel to allow a spring-loaded locking pin 74 spaced 1.5 inches from a pin 73 to drop into a hole 12c. That locks the plate 72 in place. The pin 74 may be raised against the force of the pin by pulling up on the ends of a rod 75. All of this is quite conventional in securing plates and the like to a pallet.

Figure 6:
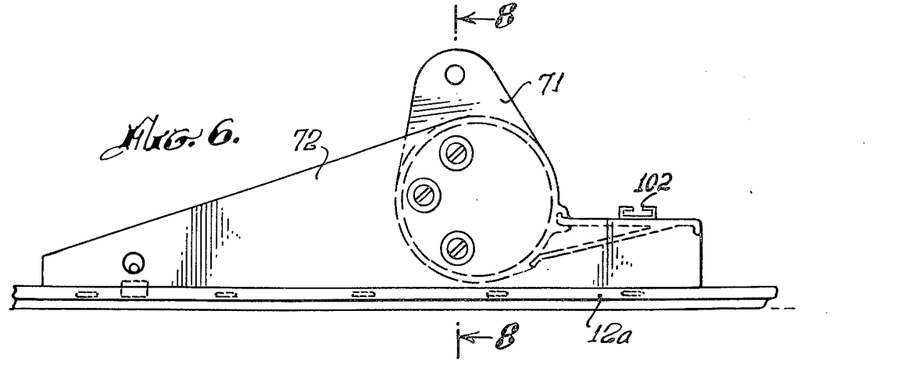
FIG. 6 is an enlarged view of the lower right corner of FIG. 4.
Figure 7:
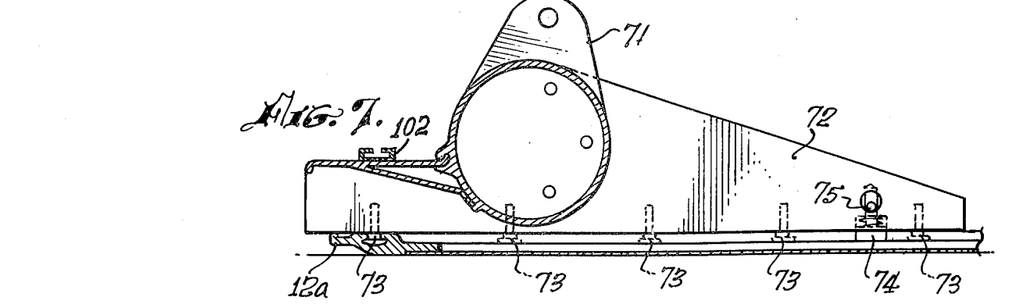
FIG. 7 is a sectional view of a lower ramp tube taken along a line 7—7 in FIG. 3.
Figure 8:
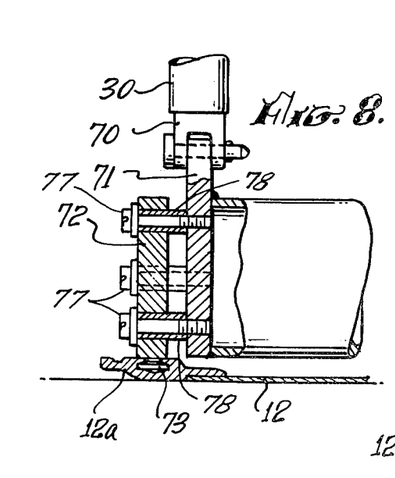
FIG. 8 is a sectional view taken along a line 8-8 in FIG. 6 to illustrate details of the fastening means of FIGS. 6 and 7.
Figure 9:
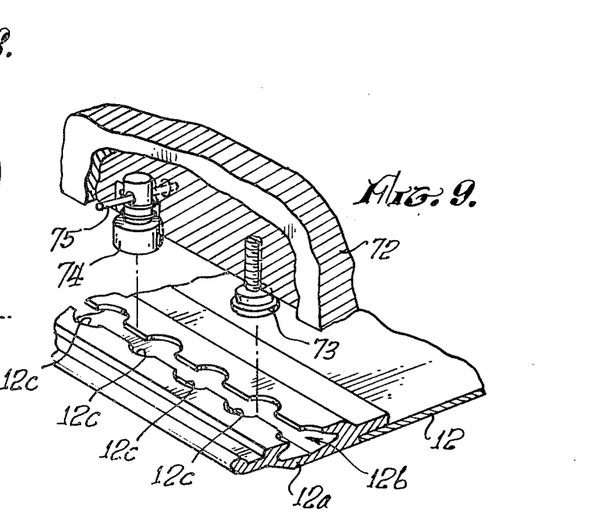
FIG. 9 illustrates in an isometric view the fasteners of the fastening means of FIGS. 6 and 7.

The plate 72 thus secured to the pallet is secured to the ear plate 71 which is in turn welded to the tube. The plate 72 is secured to the ear plate 71 by bolts 77 passing through holes in the plate and threaded into the ear plate 71. Spacers 78 are placed between the plate and clevis ear of an appropriate length to fill the space between the plate and clevis ears. The spacers are thus relied upon to adjust for any variation in the size of the pallets vis-a-vis the length of the assembled torque tube 20, including the center locking mechanism 20c which is rigidly attached to the inside edges of the pallets.

Before describing the locking mechanism 20c for the torque tube 20, which is the same though turned around for other torque tubes, the bars 36 and 38 for spacing the upper torque tubes will be described with reference to just one as both are alike. Referring to the bar 36, shown in FIG. 11, it is comprised of one tube 36a which slides inside another tube 36b. Holes on one inch centers are aligned for a lock pin 36c to adjust spacing between upper torque tubes in one inch increments. Each end of the telescoping tubes has welded to it two parallel plates 36d with two holes, and a notch at the end, one inboard hole having a permanent pin and the outboard hole being adapted to receive a lock pin 36e. Welded to the torque tubes is a plate 36f having two holes and a notch at the end, the inboard hole having a permanent pin that protrudes on both sides to engage the notches at the ends of the plates 36d. The notch at the end of the plate 36f engages the permanent pin through the inboard holes of the parallel plates 36d. Once the lock pin 36e is inserted at each end, the plates 36d are rigidly secured to the plate 36f, which in turn is welded to the torque tube, thus securing the spacing bar at each end. In practice the spacing bar is secured in place before the spacing adjustment is made with the insertion of lock pin 36c.

Figures 11, 12:
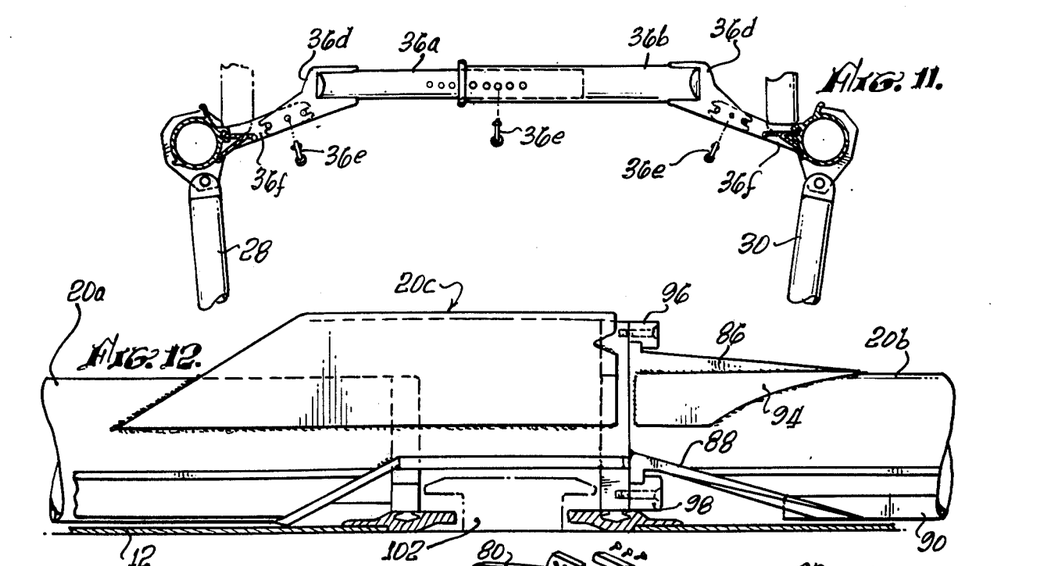
FIG. 11 is a sectional view taken along a line 11—11 in FIG. 10 to illustrate details of spreader bars shown in FIGS. 1, 2 and 3.
FIG. 12 illustrates details of locking means for lower ramp tubes of the structure shown in FIG. 10.
Figure 13:
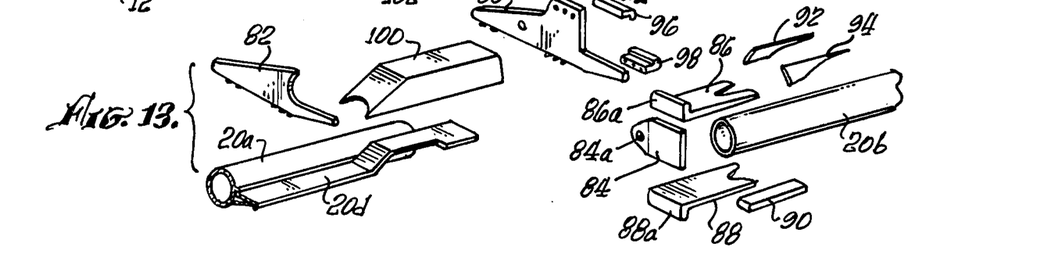
FIG. 13 is an exploded view of detailed parts for the locking means of FIG. 12.

The bridge extensions for the lower torque tubes, such as for the torque tube 20, will now be described with reference to FIG. 12 which shows an enlarged view in elevation for the bridge extension 20c, and FIG. 13 which illustrates an exploded view of parts in the bridge extension of FIG. 12. To secure the torque tubes 20a and 20b to the pallets 12 and 10, there are two plates 80 and 82 secured to the pallets like the end plate 72 (FIGS. 6–9). Those plates 80 and 82 are welded to the tube 20a with plate 80 on the end and plate 82 in about 7.5 inches.

A block 84 is welded to the end of the tube 20b, with flanged plates 86 and 88 welded to the top and bottom of the tube 20b. A block 90 welded to a cutout in the tube 20b is also welded to the flanged block 88 to enhance its rigid connection to the tube. Webs 92 and 94 are welded between the block 86 and the tube 20b to enhance its rigid connection. The block 80 has screwed to it two L-shaped blocks 96 and 98 facing each other to form a locking channel for the flanged ends 86a and 88a of the plates 86 and 88.

The plate 80 has a square top to it for the L-shaped block 96. There is therefore welded to the tube 20a and the plate 80 a cover 100. The flanged ramp 20d on the side of the tube 20 is raised to clear the edges of the pallets 10 and 12, and a flanged pallet-locking member 102 secured to the deck of the aircraft. In practice, the plates 80 and 82 are locked on the pallets 10 and 12 to secure the torque tube 20a to the two pallets, thus spacing the two pallets as required. Then the flanged ends of the blocks 86 and 88 are slipped into the slot formed by the L-shaped blocks 96 and 98 secured to the plate 80. Finally a locking pin is inserted through a hole in an ear 84a of the block 84 and a hole in the plate 80. This then locks the inner end of the torque tube 20b to the pallet 10.

The flanged ramps of the rails are each equipped with a short section of "seat track" very similar in construction to the edge frame 12c of the pallet 12. These sections, identified by the reference numeral 102 in FIG. 3 and FIG. 4, are used to receive a strap assembly equipped with two standard double-stud cargo tie-down fittings, each comprising a nylon strap with a hook at one end to connect to the automobile and the two tie-down fittings along the track, one as nearly below the hook as possible and the other (at the other end of the strap) positioned along the track for loading and position adjustment. These tracks are also used to retain two wheel chucks located at diagonally opposite corners of the automobile.

A particular embodiment of a novel structure has been disclosed for carrying as many as four automobiles on a pair of conventional 96 inch × 125 inch IATA-type pallets. It employs one or two pair of rails for locking the two pallets together to act as one, each pair supporting one automobile and structure for supporting another pair of rails on four corner posts with sufficient rigidity to support a second automobile above the first. The spacing of the rails for the automobile in the lower tier is established by the positions at which the lower rails are locked on the pallets, and the spacing of the rails for the automobile in the upper position is established by a pair of spreader tubes, one just forward of the front wheels and one just back of the rear wheels of the automobile in the upper position. Also establishing the spacing between the upper rails is an X-bar gate between the support posts at each end. The pallets, spreader tubes and X-bar gates provide great transverse stability for the carrier structure regardless of the spacing of the upper and lower rails. For lateral stability, the corner posts are tilted toward each other a small angle. In addition, corner tie bars are added between each upper rail and its supporting corner post at each end. These corner tie bars are shown in FIG. 3 as tubes 104, 106, 108 and 110. Each tube has an ear welded at its upper end that is pinned to a clevis welded to an upper rail, as shown. Conventional lock pins are used, as in other pinned joints, for ease in assembly and disassembly. The lower end of each tie bar is welded to a corner post. Other novel features of structure have been shown and described. However, not all of them need necessarily be included, and modifications and variations of any of the structural features may occur to one normally skilled in the art. For example, as a function of economics and production qualities, any number of detailed design and manufacturing techniques may be employed. Without altering the functional characteristics of the carrier, a single casting may be used in lieu of several welded components. Consequently, it is intended that the claims be interpreted to cover such modifications and variations.

What is claimed is:

1. An automobile carrier for use on air cargo pallets to carry two automobiles, one automobile over the other, on a structure locked transversely across two pallets, said structure being comprised of:

a first pair of rails and means for locking the two pallets to said rails to act as one, said first pair of rails being spaced and locked on said pallets for the tread width of an automobile to be supported by said first pair of rails, four posts, one pivotally connected to and supported substantially upright at each end of said rails of said first pair, a second pair of rails, each pivotally supported at its ends, in a position substantially parallel to said one pair, between the upper ends of a pair of said posts standing in a substantially upright position at the ends of one of said first pair of rails, a plurality of spreader tubes between said second pair of rails for spacing said second pair of rails for the tread width of the automobile to be carried in the upper position, four corner tie bars, one between each corner post and a connected rail for lateral stability of the structure in supporting an automobile in the upper position, and an X-bar gate between the support posts for said second pair of rails at each end, whereby the pallets, spreader tubes and X-bar gates provide transverse stability for the carrier structure of the spacing of the upper and lower rails.

2. An automobile carrier as defined in claim 1 wherein said X-bar gate opens at the center and is pivotally connected to corner posts at the upper and lower outer extremities, and said X-bar gate includes two plates, each with slotted blocks for a locking bar to slide in said slotted blocks and two locking bars, each of said locking bars sliding in said slotted blocks of a different one of said two plates into overlapping position with the other block and each of said locking bars having a matrix of holes, whereby at least one hole in the end of one bar will be aligned with one hole in the overlapping end of the other bar for any combination of the spacing of said lower rails and the spacing of said upper rails within predetermined limits of spacing between each pair of rails.

3. An automobile carrier as defined in claim 2 wherein said corner tie bars are between corner posts and rails of said second pair, and said corner posts and corner tie bars are pivotally connected to rails of said second pair, whereby upon disconnecting the pivotal connection between corner posts at one end of said first pair of rails, the posts may be pivoted to move the bottom ends away from each other to expand the space between them for loading an automobile on said first pair of rails for transportation.

4. The combination of claim 3 including means for temporarily supporting said second pair of rails while said posts at said one end of said one pair of rails are pivoted outwardly away from each other.

5. The combination of claim 4 including means for temporarily bracing each of said posts outwardly pivoted in a position away from the rails.

6. The combination of claim 5 wherein each of said bracing means is pivotally connected to a post with the pivot axis at an angle with the axis of the post so, as when pivoted in for bracing, to extend downwardly and inwardly to engage one of said first pair of rails, and when pivoted out of the way while not in use in bracing, to not engage said one of said first pair of rails.

7. The combination of claim 3 wherein each rail of said first pair of rails is comprised of a torque tube with a horizontally flanged ramp connected thereto and oriented on the outside of the torque tube, said torque tube of each rail of said first pair of rails being clevised at the ends to corner posts, and each rail of said second pair of rails is comprised of a torque tube with horizontally flanged ramp connected thereto and oriented on the outside of the torque tube, said torque tube of each rail of said second pair of rails being clevised at the ends to corner posts, whereby this inside-outside orientation of flanged ramps causes the lower ends of said corner posts to be inside the wheels of an automobile supported by the first pair of rails and the upper ends of said posts to be outside the wheels of an automobile supported by the second pair of rails.

8. The combination of claim 7 wherein said first pair of rails is locked to said pallets by means for quickly connecting said first pair of rails to and disconnecting said first pair or rails from said pallets, and said posts are connected to said rails, end gates, and corner tie bars by lock pins through ears and clevises, and said spreader tubes are connected to said second pair of rails with lock pins through holes in aligned plates rigidly connected to flanged ramps of said second pair of rails and said spreader tubes, whereby said spreader bars absorb any torque load on said torque tubes of said second pair of rails and the carrier structure may be disassembled for compact shipment while not carrying automobiles.

9. The combination of claim 8 wherein said spreader tube is comprised of two tube sections, one fitting inside the other for adjustment in length by sliding said one section in the other, said two sections having a plurality of holes spaced uniformly apart in a common plane, and a lock pin for insertion into aligned holes in said two sections after adjusting length.

10. An automobile carrier for use on two standard air cargo pallets to carry at least two automobiles, one above the other, said carrier for two automobiles being affixed across said two pallets, said carrier being comprised of two lower rails for one autombile, each lower rail being secured to and supported by said pallets to form one integral support unit, two upper rails for a second automobile, four corner posts, each post being pivotally connected between one end of a lower rail to one end of an upper rail, to support the ends of the upper rails from ends of the lower rails, X-bar end gates between posts at the ends of the rails for transverse rigidity, and corner tie bars between corner posts and at least one set of said lower and upper rails for lateral rigidity, said rails being connected to said posts and corner tie bars with lock pins, and said posts being connected to said end gates with means for quick assembly and disassembly, and means for quickly locking and unlocking said set of lower rails on said pallets.

11. An automobile carrier as defined in claim 10 wherein said upper and lower rails are each comprised of two sections and means for quickly connecting and disconnecting said two sections of a rail.

12. An automobile carrier as defined in claim 11 including a plurality of upper rail spreaders, and means for quickly connecting and disconnecting said spreaders from said upper rails, each spreader including means for quickly adjusting its length.

13. A carrier for two automobiles assembled transversely across two pallets comprising lower rail assemblies locked onto said pallets where both assemblies are identical for interchangeability, each lower rail assembly being comprised of a tube structure having a horizontal flange extending outwardly, each flange serving as a ramp for automobile wheels, and each tube serving as a curb or guide in loading an automobile on said ramps, each tube structure on each side being in two parts and joined together at the center by a locking bridge assembly, each part of the tube structure being provided with an ear at the end remote from the locking bridge assembly for connecting to a clevis at the end of a support post, two pairs of posts, two upper rail assemblies, one connected between each pair of posts on each side, both upper rail assemblies being identical for interchangeability, each upper rail assembly being comprised of two tube structures, each having a horizontal flange extending inwardly, said two upper tube structures being connected by a third tube bent upwardly in the middle, each half of said bent tube being inserted into one of the two tubes to form one upper rail assembly bent upwardly in the middle, the flanges of the upper tube assemblies serving as ramps for a second automobile while the tubes serve as curbs or guides used in loading the second automobile.

14. The combination of claim 13 including spreader tubes which keep the upper rails spread the desired distance for the second automobile.

15. The combination of claim 14 including an X-bar brace which unfastens at the center to open as gates swung from the posts, said X-bar brace providing lateral rigidity while fastened closed, and braces from the corner posts to the upper rail assemblies for lateral rigidity.

16. The combination of claim 15 wherein said posts are pivotally connected to said upper rails in order to be swung outwardly while disconnected from the lower rails, and including a brace hinged near the lower end of each post for engagement with a lower rail while in an outwardly swung position, all while said X-bar braces are open to afford the clearance necessary to load or unload an automobile from the lower rails, and further including means for supporting the upper rails during this loading or unloading procedure.

* * * * *